(No Model.)

G. W. GREGORY.
TREADLE SUPPORT FOR SEWING MACHINES.

No. 256,563. Patented Apr. 18, 1882.

Witnesses.
John F. C. Rheinhart
Bernice J. Noyes.

Inventor.
George W. Gregory

UNITED STATES PATENT OFFICE.

GEORGE W. GREGORY, OF BOSTON, MASSACHUSETTS, ASSIGNOR TO THE WEED SEWING MACHINE COMPANY, OF HARTFORD, CONN.

TREADLE-SUPPORT FOR SEWING-MACHINES.

SPECIFICATION forming part of Letters Patent No. 256,563, dated April 18, 1882.

Application filed November 10, 1881. (No model.)

*To all whom it may concern:*

Be it known that I, GEORGE W. GREGORY, of Boston, Suffolk county, State of Massachusetts, have invented an Improvement in Treadle-Supports for Sewing-Machines, of which the following description, in connection with the accompanying drawings, is a specification.

This invention has for its object to support the treadle or foot-board of a sewing or other machine so that it may be moved with the minimum of friction.

I am aware that V-shaped or scale bearings are old in connection with sewing-machine treadles—as, for instance, a long rod to which the treadle is secured has been provided at its ends in the side frames of the machine-stand with V-shaped bearings.

In this my invention, to insure cheapness of construction and facility of adjustment, I have adjustably secured to the usual cross rod or brace which connects together the side pieces of the stand two collars, each of which is provided with a V-shaped bearing and a cap, and I have provided the treadle at each side with ears, each having ∧-shaped recesses at its under side, and rounded at its upper side to fit respectively the V-shaped bearing of one of the collars and be held down thereon by one of the caps.

Figure 1:
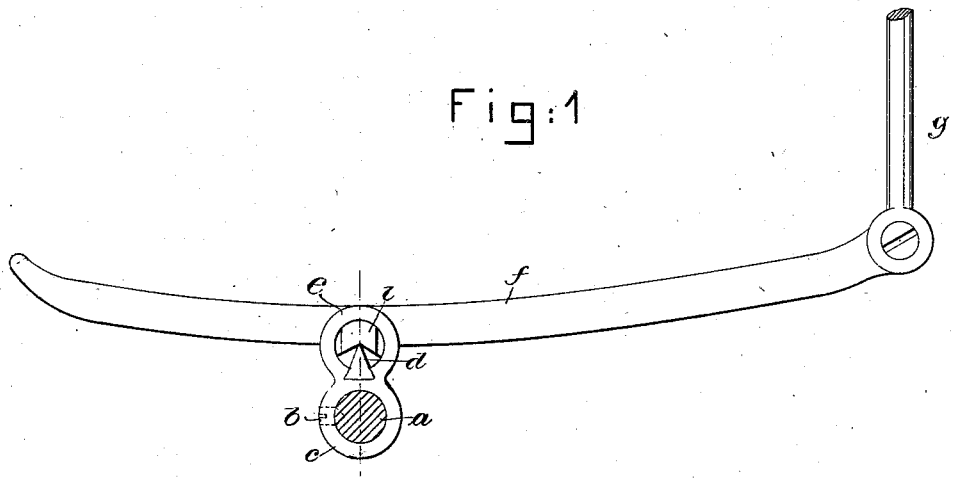
Figure 2:
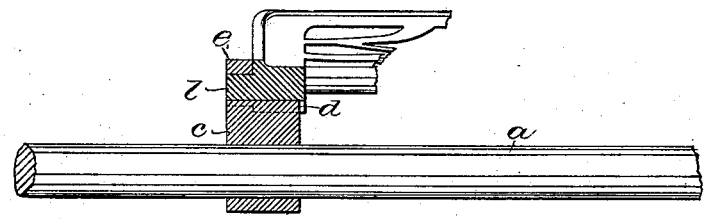

Figure 1 represents in side elevation a sufficient portion of a sewing-machine treadle and co-operating parts to illustrate my invention, and Fig. 2 a sectional detail thereof.

The rod *a* is that commonly employed at the center of the usual cast-iron side pieces of a sewing-machine stand to hold the said side pieces properly together, the said rod in practice being connected with the said side pieces by nuts or screws in any usual way, not necessary to be herein shown. The rod has adjustably attached to it, at suitable distances apart, by screws *b*, two collars, *c*, one only of which is shown. These collars have upwardly-extended V-shaped bearings *d*, and over them a narrow cap, *e*, preferably formed as part of the collar *c*.

The V-shaped bearing is shown in Fig. 1 as driven into a dovetailed groove, where it will be held firmly. The V-shaped bearing, being separate, may be made of steel or other than cast-iron; but, if desired, this V-shaped bearing may be cast as part of the collar *c*.

The treadle *f*, having the usual rod or link to be connected with the crank-pin of the usual driving-wheel of the sewing-machine stand or table, has upon each side edge a projecting ear, *l*, the under side of which is provided with a ∧-shaped recess to rest upon the bearing *d*, while the upper side of the ear *l* is rounded to fit the inner circular portion of the cap *e*, the latter, once upon the ear *l*, preventing it from being lifted from the said bearing *d*. The collars *c*, once fitted securely to rod *a*, and the ears *l* of the treadle placed on the bearings *d* under the caps *e*, will support the treadle properly, and as the opposite sides of the treadle in practice act against the inner face of one of the caps, as shown in Fig. 2, the treadle, it is obvious, cannot move laterally.

I am aware that sewing-machine treadles have had V-shaped bearings, as in United States Patents No. 148,759 and 106,242; but neither of the said patents shows a bearing constructed in accordance with my invention.

I claim—

1. The collars *c*, provided with the V-shaped bearings and caps, combined with a treadle having ears recessed or adapted at their under sides to rest on the V-shaped bearings, and rounded at their upper sides to be held down by the caps, substantially as described.

2. The rod *a*, the collars *c*, adjustably secured thereto and provided with V-shaped bearings *d*, and covering-caps *e*, combined with the treadle having ears *l*, recessed to rest on the bearings *d*, and rounded at their upper sides to be held down by the said caps, substantially as described.

In testimony whereof I have signed my name to this specification in the presence of two subscribing witnesses.

GEO. W. GREGORY.

Witnesses:
JOS. P. LIVERMORE,
B. J. NOYES.